United States Patent
Zirwas et al.

(10) Patent No.: US 10,218,083 B2
(45) Date of Patent: Feb. 26, 2019

(54) METHOD, APPARATUS AND SYSTEM

(71) Applicant: Nokia Solutions and Networks GmbH & Co. KG, Munich (DE)

(72) Inventors: Wolfgang Zirwas, Munich (DE); Berthold Panzner, Holzkirchen (DE)

(73) Assignee: Nokia Solutions and Networks GMBH & Co. KG, Munich (DE)

( * ) Notice: Subject to any disclaimer, the term of this patent is extended or adjusted under 35 U.S.C. 154(b) by 129 days.

(21) Appl. No.: 15/308,706

(22) PCT Filed: May 12, 2014

(86) PCT No.: PCT/EP2014/059645
§ 371 (c)(1),
(2) Date: Nov. 3, 2016

(87) PCT Pub. No.: WO2015/172807
PCT Pub. Date: Nov. 19, 2015

(65) Prior Publication Data
US 2017/0149143 A1    May 25, 2017

(51) Int. Cl.
*H01Q 13/00* (2006.01)
*H01Q 21/12* (2006.01)
*H01Q 1/24* (2006.01)
*H01Q 21/28* (2006.01)
*H04B 7/0413* (2017.01)

(52) U.S. Cl.
CPC ............ *H01Q 21/12* (2013.01); *H01Q 1/246* (2013.01); *H01Q 21/28* (2013.01); *H04B 7/0413* (2013.01)

(58) Field of Classification Search
CPC ........ H01Q 21/12; H01Q 1/246; H01Q 21/28; H01Q 13/00

USPC ......................................................... 343/785
See application file for complete search history.

(56) References Cited

U.S. PATENT DOCUMENTS

| | | | | |
|---|---|---|---|---|
| 5,223,849 A | * | 6/1993 | Kasevich | H01Q 17/00 343/895 |
| 6,239,764 B1 | * | 5/2001 | Timofeev | H01Q 1/523 343/700 MS |
| 6,583,766 B1 | | 6/2003 | Rawnick et al. | |
| 8,184,062 B2 | * | 5/2012 | Hartenstein | H01Q 1/007 343/799 |
| 8,521,107 B2 | | 8/2013 | Knudsen et al. | |

(Continued)

FOREIGN PATENT DOCUMENTS

| | | |
|---|---|---|
| DE | 10-2010029314 A1 | 1/2011 |
| EP | 2579677 A1 | 4/2013 |

OTHER PUBLICATIONS

Rusek et al., "Scaling Up MIMO: Opportunities and Challenges With Very Large Arrays", IEEE Signal Processing Magazine, vol. 30, No. 1, Jan. 2013, pp. 40-60.

(Continued)

*Primary Examiner* — Huedung X Mancuso
(74) *Attorney, Agent, or Firm* — Harrington & Smith

(57) ABSTRACT

There is provided an apparatus comprising a plurality of arrays; each array comprising a plurality of antenna elements, adjacent antenna elements of the array spaced at a first distance from one another and wherein the plurality of arrays are spaced from one other at a second distance, wherein the second distance is greater than the first difference.

20 Claims, 10 Drawing Sheets

(56) References Cited

U.S. PATENT DOCUMENTS

| | | | |
|---|---|---|---|
| 8,872,719 B2* | 10/2014 | Warnick | H01Q 21/061 343/853 |
| 2010/0225552 A1 | 9/2010 | Takayuki et al. | |
| 2010/0304688 A1 | 12/2010 | Knudsen et al. | |

OTHER PUBLICATIONS

Larsson et al., "Massive MIMO for Next Generation Wireless Systems", IEEE Communications Magazine, vol. 52, No. 2, Feb. 2014, pp. 186-195.

Janaswamy, "Effect of Element Mutual Coupling on the Capacity of Fixed Length Linear Arrays", IEEE Antennas and Wireless Propagation Letters, vol. 1, No. 1, 2002, pp. 157-160.

Wallace et al., "Mutual Coupling in MIMO Wireless Systems: A Rigorous Network Theory Analysis", IEEE Transactions on Wireless Communications, vol. 3, No. 4, Jul. 2004, pp. 1317-1325.

Lau et al., "Impact of Matching Network on Bandwidth of Compact Antenna Arrays", IEEE Transactions on Antennas and Propagation, vol. 54, No. 11, Nov. 2006, pp. 3225-3238.

Jungnickel et al., "Capacity of MIMO Systems With Closely Spaced Antennas", IEEE Communications Letters, vol. 7, No. 8, Aug. 2013, pp. 361-363.

International Search Report and Written Opinion received for corresponding Patent Cooperation Treaty Application No. PCT/EP2014/059645, dated Mar. 2, 2015, 17 pages.

Sahalos, "Linear Arrays", Antenna Engineering Handbook, 2007, pp. 3-4.

"What Base Station Antenna Configuration Is Best for LTE-Advanced", White Paper, Commscope, WP-106096, Sep. 1, 2012, pp. 1-22.

\* cited by examiner

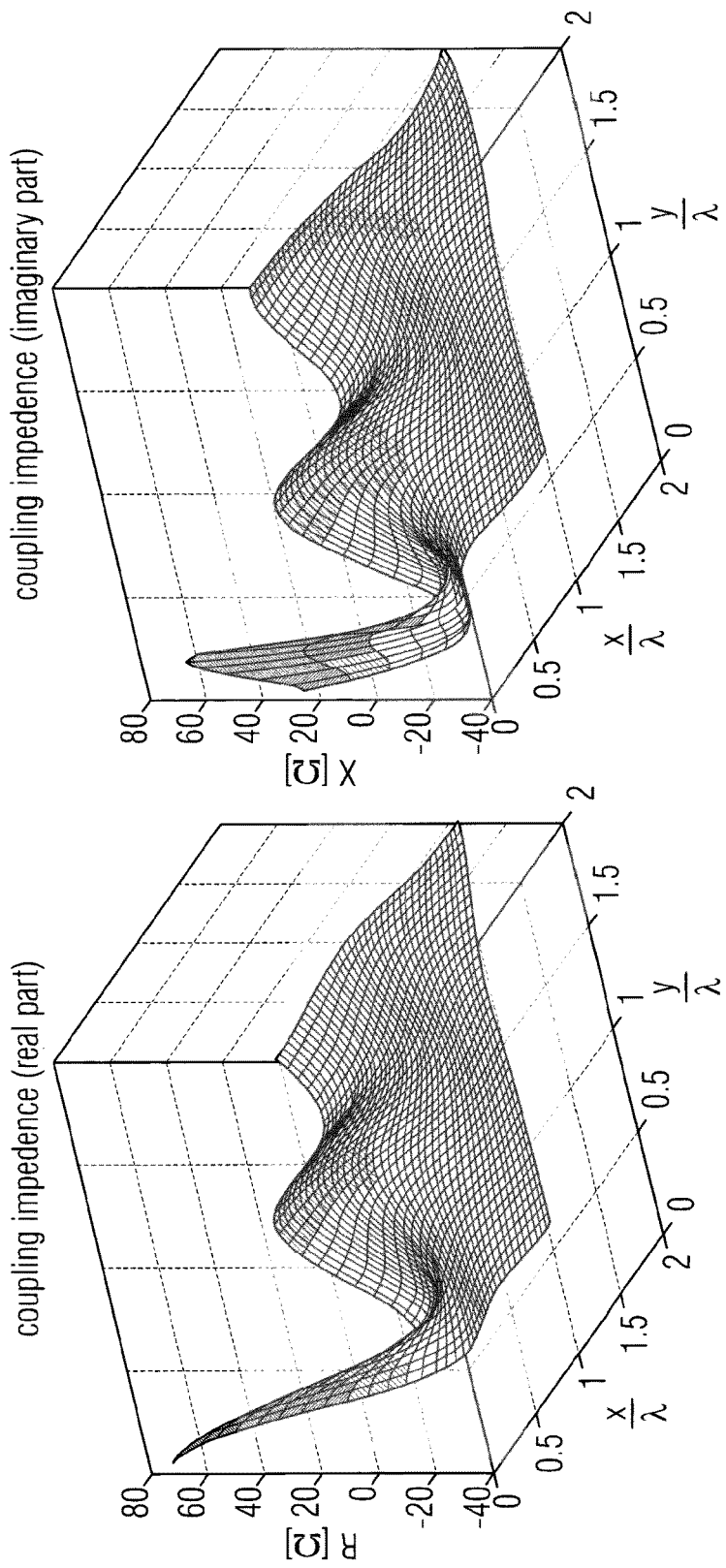

METHOD, APPARATUS AND SYSTEM

RELATED APPLICATION

This application was originally filed as PCT Application No. PCT/EP2014/059645 filed May 12, 2014.

The present application relates to an apparatus, method and system and in particular but not exclusively, to MIMO (Multiple-Input and Multiple-Output) antennas.

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the $3^{rd}$ Generation Partnership Project (3GPP). The various development stages of the 3GPP LTE specifications are referred to as releases.

In a first aspect there is provided an apparatus comprising a plurality of arrays; each array comprising a plurality of antenna elements, adjacent antenna elements of the array spaced at a first distance from one another and wherein the plurality of arrays are spaced from one other at a second distance, wherein the second distance is greater than the first difference.

The first distance may be such that the antenna elements of an array are mutually coupled.

The second distance may be such that there is negligible mutual coupling between the arrays.

The antenna elements of the elements may be arranged linearly.

The antenna elements may be arranged in a uniform linear array.

The antenna elements of the arrays may be configured to transmit at a wavelength, λ, and the first distance may be between 0.01λ and 0.3λ.

The first distance may be 0.25λ.

The first distance may be 0.1λ.

The antenna elements of the arrays may configured to transmit at a wavelength, λ, and the second distance may be greater than, or equal, to 0.25λ.

The second distance may be greater than, or equal to, 0.5λ.

The antenna elements may comprise dipole antenna elements.

The antenna elements may comprise a half wave dipole element.

The antenna elements may comprise a bi-quad antenna element.

The antenna elements may be vertically offset from one another.

The apparatus may comprise variable impedance passive antenna elements.

Each array may comprise between two and eight antenna elements.

Each array may comprise four antenna elements.

The antenna elements may be configured to operate at a first frequency less than or equal to 10 GHz.

The antenna elements may be configured to operate at a first frequency less than or equal to 5 GHz.

In a second aspect there is provided an array for use in an antenna, said array comprising a plurality of antenna elements, wherein adjacent antenna elements are spaced at a first distance from one another.

In a third aspect there is provided a method comprising receiving, at a user equipment, antenna information and determining precoding information in dependence of the antenna information.

In a fourth aspect there is provided a method comprising causing antenna information to be sent to a user equipment and receiving precoding information, the precoding information determined in dependence of the antenna information.

In a fifth aspect there is provided an apparatus, said apparatus comprising means for receiving, at a user equipment, antenna information and means for determining precoding information in dependence of the antenna information In a sixth aspect there is provided an apparatus, said apparatus comprising means for causing antenna information to be sent to a user equipment and means for receiving precoding information, the precoding information determined in dependence of the antenna information.

In a seventh aspect there is provided an apparatus, said apparatus comprising at least one processor and at least one memory including computer code for one or more programs, the at least one memory and the computer code configured, with the at least one processor, to cause the apparatus at least to receive antenna information and determine precoding information in dependence of the antenna information.

In an eighth aspect, there is provided an apparatus, said apparatus comprising at least one processor and at least one memory including computer code for one or more programs, the at least one memory and the computer code configured, with the at least one processor, to cause the apparatus at least to cause antenna information to be sent to a user equipment and receive precoding information, the precoding information determined in dependence of the antenna information.

In a ninth aspect there is provided a computer program embodied on a computer-readable storage medium, the computer program comprising program code for controlling a process to execute a process, the process comprising: receiving, at a user equipment, antenna information and determining precoding information in dependence of the antenna information.

In a tenth aspect there is provided a computer program embodied on a computer-readable storage medium, the computer program comprising program code for controlling a process to execute a process, the process comprising: causing antenna information to be sent to a user equipment and receiving precoding information, the precoding information determined in dependence of the antenna information.

In a tenth aspect there is provided a computer program product comprising computer executable instructions which when run are configured to perform the methods described above.

In the above, many different embodiments have been described. It should be appreciated that further embodiments may be provided by the combination of any two or more of the embodiments described above.

Embodiments will now be described, by way of example only, with reference to the accompanying Figures in which:

FIG. 4a shows a graph of real part of coupling as a function of distance between antennas;

FIG. 4b shows a graph of imaginary part of impedance as a function of distance between antennas;

In the above, many different embodiments have been described. It should be appreciated that further embodiments may be provided by the combination of any two or more of the embodiments described above.

In the following certain exemplifying embodiments are explained with reference to a wireless or mobile communication system serving mobile communication devices. Before explaining in detail the exemplifying embodiments, certain general principles of a wireless communication system and mobile communication devices are briefly explained with reference to FIGS. 1 and 2 to assist in understanding the technology underlying the described examples.

In a wireless communication system mobile communication devices or user equipment (UE) 102, 103, 105 are provided wireless access via at least one base station or similar wireless transmitting and/or receiving node or point. In the FIG. 1 example two overlapping access systems or radio service areas of a cellular system 100 and 110 and three smaller radio service areas 115, 117 and 119 provided by base stations 106, 107, 116, 118 and 120 are shown. Each mobile communication device and station may have one or more radio channels open at the same time and may send signals to and/or receive signals from more than one source. It is noted that the radio service area borders or edges are schematically shown for illustration purposes only in FIG. 1. It shall also be understood that the sizes and shapes of radio service areas may vary considerably from the shapes of FIG. 1. A base station site can provide one or more cells. A base station can also provide a plurality of sectors, for example three radio sectors, each sector providing a cell or a subarea of a cell. All sectors within a cell can be served by the same base station.

A base station may comprise at least one base band unit (BBU) which can perform system operations such as communicating with a core network. In some embodiments the base transceiver station comprises at least one RF unit (RU) or remote RF unit (RRU). The base band unit communicates with a radio frequency units (RU)/remote radio units (RRU) over a defined interface. The radio frequency unit is configured to convert base band signals into a format suitable for transmission over a wireless network. The radio frequency unit may send signals for wireless transmissions to an antenna system. The antenna system may comprises a plurality of antennas. In some embodiments the radio frequency unit is separate from the base band unit, however alternatively the radio frequency unit and the base band unit may be comprised in the same network entity. In some other embodiments the antenna system and the radio frequency unit may be comprised in the same network entity. The plurality of antennas may be used together for the purposes of beam forming wireless transmissions.

Figure 1:
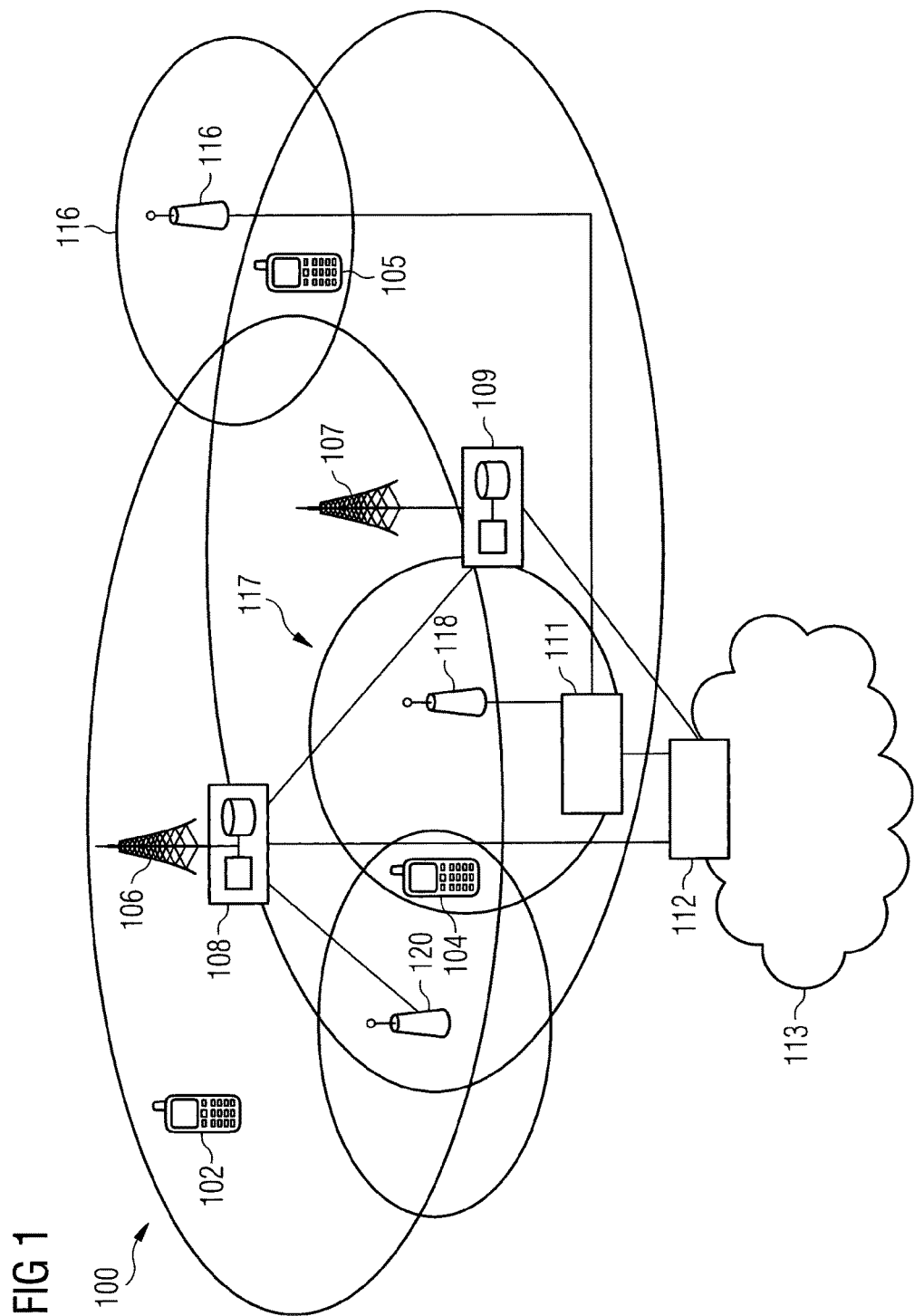
FIG. 1 shows a schematic diagram of an example communication system comprising a base station and a plurality of communication devices.
Figure 12:
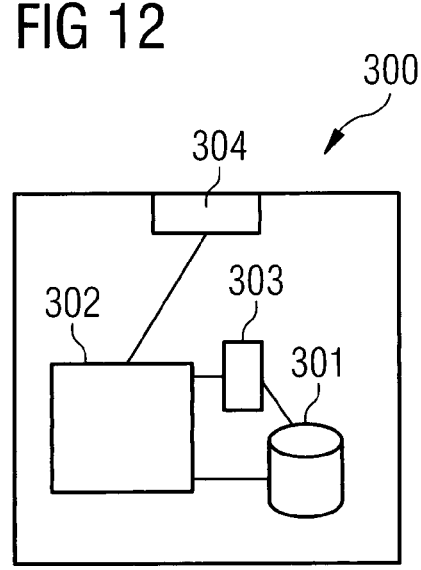
FIG. 12 shows a schematic diagram of an example control apparatus.

Base stations are typically controlled by at least one appropriate controller apparatus so as to enable operation thereof and management of mobile communication devices in communication with the base stations. In FIG. 1 control apparatus 108 and 109 is shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. The control apparatus may be as shown in FIG. 12 which is discussed later.

In FIG. 1 stations 106 and 107 are shown as connected to a serving gateway (SGW) 112. The smaller stations 116, 118 and 120 are connected to a further gateway function 111 which is connected to the S-GW 112. In some embodiments, the further gateway function 111 is omitted. The S-GW 112 may be connected to, for example, the internet 134 via a PGW (PDN (packet data network) gateway) 132.

The base stations are also connected to a MME 136 (mobility management entity) which in turn is connected to a HSS (home subscriber server) 138.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/ Medium Access Control/Physical layer protocol (RLC/ MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

Figure 2:
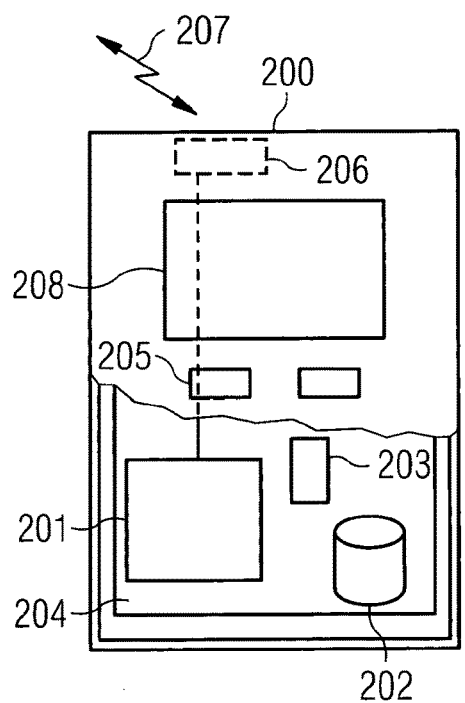
FIG. 2 shows a schematic diagram of an example mobile communication device.

A possible mobile communication device for transmitting and retransmitting information blocks towards the stations of the system will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information. The mobile device 200 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A wireless communication device can be provided with a Multiple Input/Multiple Output (MIMO) antenna system. MIMO systems use multiple antennas at the transmitter and receiver along with advanced digital signal processing to improve link quality and capacity. Although not shown in FIGS. 1 and 2, multiple antennas can be provided, for example at base stations and mobile stations, and the transceiver apparatus 206 of FIG. 2 can provide a plurality of antenna ports. More data can be received and/or sent where there are more antenna elements. A station may comprise an array of multiple antennas. Signalling and muting patterns can be associated with transmitter antenna numbers or receiver port numbers of MIMO arrangements.

A mobile device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

In order to achieve asymptotic spectral efficiency gains, massive MIMO or large-scale antenna arrays might be deployed in sectors of a cellular mobile radio system. For conventional massive MIMO antennas, uniform $\lambda/2$ spaced (where $\lambda$ is wavelength) linear or square arrays of antenna elements may be used. The multitude of antennas can be exploited for serving higher number of users or for serving users with a better link budget. At lower RF frequency bands such as the 800 MHz or 2.6 GHz bands, spectral efficiency gains are desirable due to scarcity of the spectrum in this area, as well as good channel conditions. Massive MIMO promises large performance gains. However, for lower RF frequencies, the size of the antenna arrays for massive MIMOs may become an issue, especially at high site locations with good visibility.

The enlargement of the antenna array at base station sites is affected by size, physical dimensions, weight, wind load, undesired visual impact and other constraints. Thus, antenna array designs are being considered.

Conventional massive MIMO arrays assume lambda half ($\lambda/2$) spacing for suitable beamforming gains. As the wavelength increases with decreasing RF frequencies, the size of antenna arrays becomes very large for lower RF frequencies. For example, a massive MIMO array of 8 by 16 at an RF frequency of 800 MHz would have an overall antenna size of 3 m×6 m. Placing such a large array at high site locations with good visibility at street level is typically undesired by mobile network operators. Furthermore handling of such arrays might be extremely difficult.

It would be desirable to provide a low profile and compact massive MIMO array for low RF-frequencies in the range of a few GHz.

Typical proposals for reducing the dimension of massive MIMO antennas is to increase the RF frequency, i.e. to operate the system e.g. at 10, 20 GHz or even at mm Waves like 60 GHz. Antennas having dimensions of some few to some tenth of cm are possible. Channel characteristics such as achievable coverage may decrease with increasing RF-frequencies making it a good choice for small cell concept, while for macro cells in wide area scenarios coverage may suffer.

Another approach is to make antennas 'invisible' by using flat panels placed e.g. at house walls. Here one should consider that the owner of the house wall might expect extra site rental costs, placing the antennas may be more complex than at already available sites and the radio propagation may have some limitations. Due to below rooftop placement there may be significantly less coverage due to shadowing of buildings in the proximity. Furthermore, coverage may increase with increasing site height.

Close placement of antenna elements (i.e. at a fraction of $\lambda/2$) decreases the directivity, or broadens the beam over a wider arc. That is, the beam may have increased angular spread. The rank of the MIMO channel matrix may decrease due to the increasing correlation of co-located antenna elements. This counteracts the original motivation for large scale antenna deployments such as massive MIMO of achieving a high beamforming gain.

Figure 3:
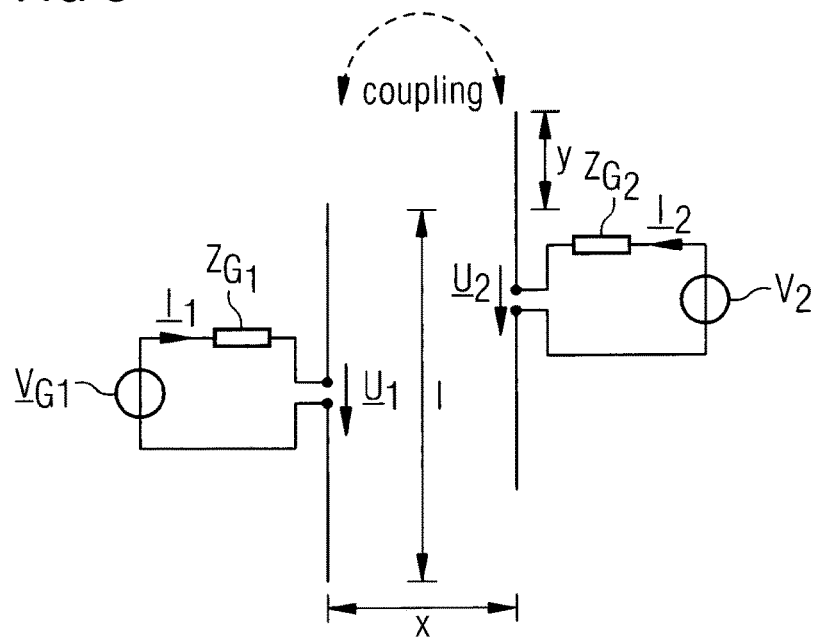
FIG. 3 shows an example circuit comprising two mutually coupled antennas.
Figure 5B:
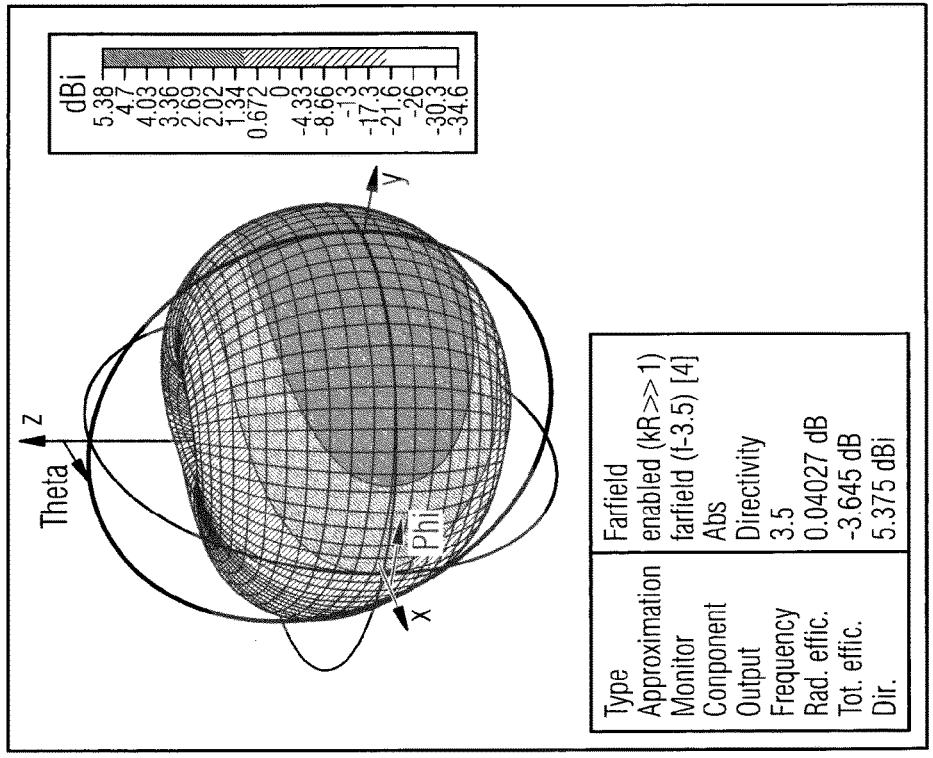
FIGS. 5a and 5b show a simulated farfield of mutually coupled dipole antennas.
Figure 5A:
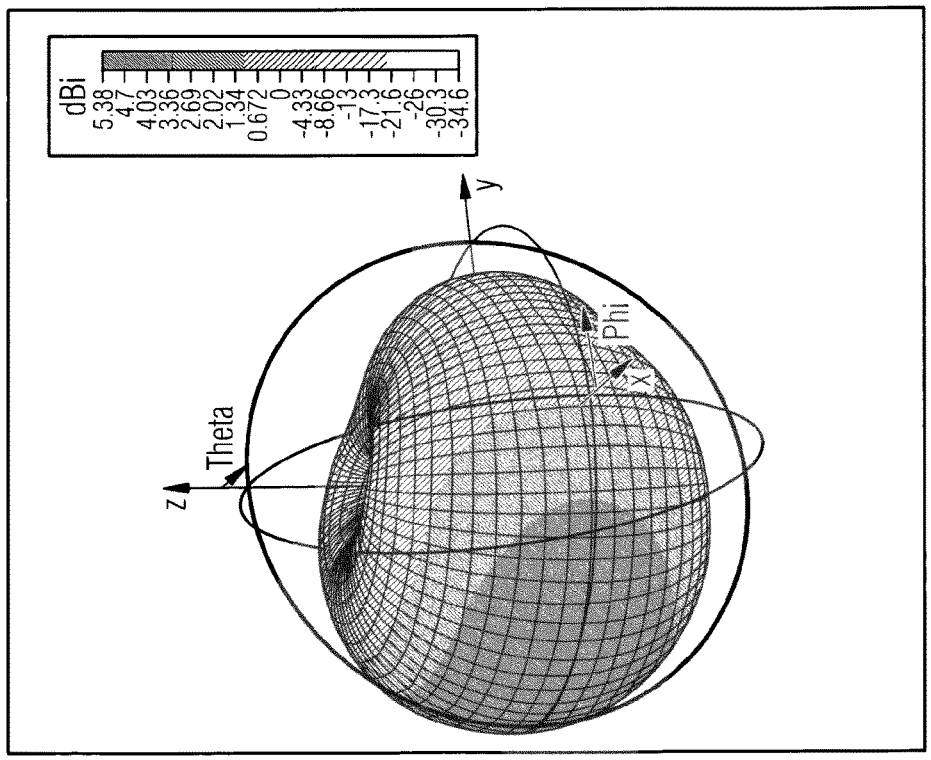

For indoor MIMO transmission with few (e.g. 4) receiver (Rx) antennas it has been demonstrated that even with very close antenna spacing, for example 0.2λ, full rank MIMO transmission is possible based on mutual coupling. FIG. 3 shows a circuit diagram of two antennas which may be mutually coupled. As shown in FIGS. 4a and 4b, when consecutive antennas elements are spaced at close proximity, for example at distances below 0.5λ, an antenna may induce a current on a neighbouring antenna in the nearfield (and vice versa if they are both active), and the coupling impedance increases, Thus one individual antenna element does not propagate autonomously but is affected by the adjacent antenna, influencing the radiation pattern of the antenna. That is, radiation patterns of two or more antennas are mutually influenced due to the mutually induced electrical current on the antennas, As shown in FIGS. 5a and 5b, mutual coupling between antenna elements deforms the original pattern of the radiating element and introduces a circular skew. The distortion in the (horizontal) pattern endows the individual antennas with different preferred directions, thus each antenna of the array has its own angular corridor. Negligible mutual coupling would produce an omnidirectional pattern (equal magnitude in all angular directions). With the close spacing dipole 1 (FIG. 5a) points to the left i.e. points in negative y direction, whereas dipole 4 (FIG. 5b) points to the right i.e. points in positive y direction. Without mutual coupling, antenna spacing lower than λ/2 leads to a strong rank reduction of the radio channel. Eventually, if all antenna elements are placed at a single location one ends at rank 1 (or rank two if polarization diversity is considered).

Mutual coupling at close antenna spacing cannot be applied directly to large antenna arrays since, for the inner antenna elements, the effect of mutual coupling may be extremely small.

An antenna design is proposed which comprises a plurality of arrays; each array comprising a plurality of antenna elements. Adjacent antenna elements of the array are spaced at a first distance from one another and the plurality of arrays are spaced from one other at a second distance, wherein the second distance is greater than the first difference. The antenna elements of the array are spaced such that they are mutually coupled. That is, radiation patterns of two or more antennas are mutually influenced due to the mutually induced electrical current on the antennas and an antenna has an angular corridor for transmission. These antenna arrays may exhibit beamforming effects based on mutual coupling. Mutual coupling induced beamforming may happen mainly at the outer antenna elements of an array. The plurality of arrays are spaced such that there is no mutual coupling between the arrays, or the mutual coupling is negligible.

Figure 6:
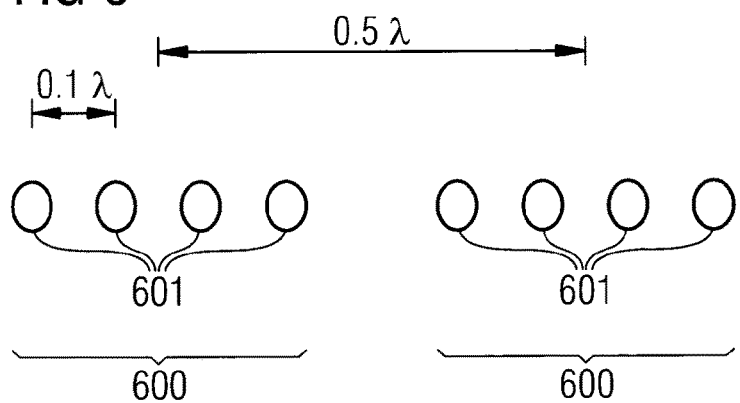
FIG. 6 shows a schematic diagram of an antenna array.

The elements of an array may be spaced between 0.01λ and 0.3λ, and between 0.01λ and 0.1λ. At these distance, the antenna elements can be considered to be mutually coupled. The arrays may be spaced at a distance above 0.25λ or above 0.5λ. At distances above 0.5λ mutual coupling is weak enough as to be negligible. With decreasing distance between antenna elements, for example from 0.25λ and below, the mutual coupling effect may significantly affect transmission patterns FIG. 6 shows an antenna setup based on mutual coupling between closely separated antenna elements. The array may comprise 0.1λ spaced Uniform Linear Array (ULA) antenna arrays 600 consisting of four antenna elements 601. The antenna elements 601 may be dipole antenna elements such as half dipole antenna elements as shown in FIG. 7a. These short antenna arrays 600 may exhibit strong beamforming effects based on mutual coupling. Mutual coupling induced beamforming may happen mainly at the outer antenna elements of a ULA array 600.

Figure 7B:
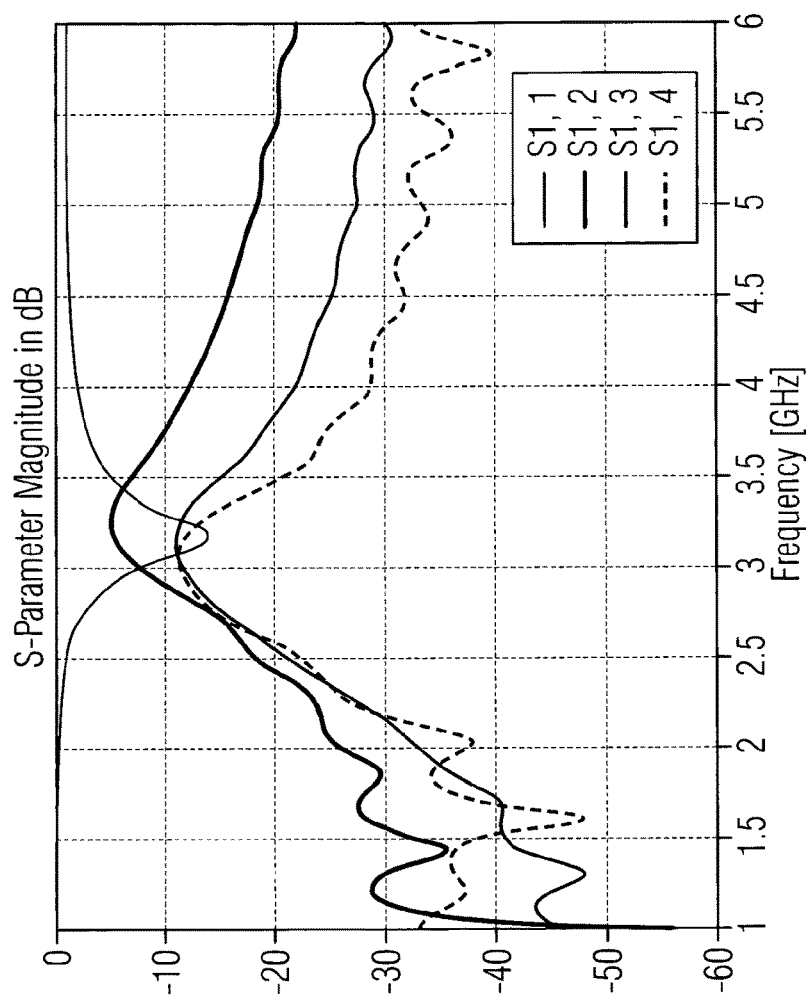
FIG. 7b shows simulated S-Parameters for a first dipole
Figure 7A:
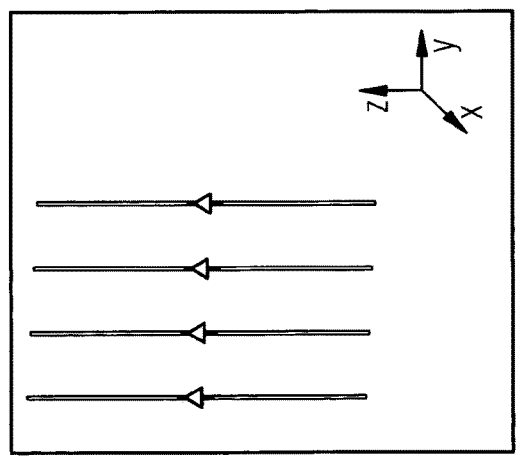
FIG. 7a shows half wavelength dipole antennas in antenna array.

FIG. 7b shows simulated S-Parameters for dipole 1 (outer left dipole in FIG. 6). The observed mutual coupling on dipole 1 is caused by all other dipoles in the array (e.g. S13 coupling from dipole 3 to dipole 1).

Two or more of the arrays 600 may be placed with, for example, 0.5λ spacing, so that the sub arrays 600 are sufficiently decoupled. Each of the sub arrays, i.e. the 0.1λ spaced ULA antenna arrays 600, will generate mutual coupling based beamformers.

Thus, low profile antennas are possible with only small to moderate loss of channel rank. For example for a Radio Frequency (RF) of 800 MHz, a 16 element ULA antenna array may be constructed with a size of approximately 1 meter. For an RF of 2.6 GHz, the size of a sixteen element ULA antenna array would be approximately 35 cm, which is comparable to two column outdoor macro antennas.

Figure 8:
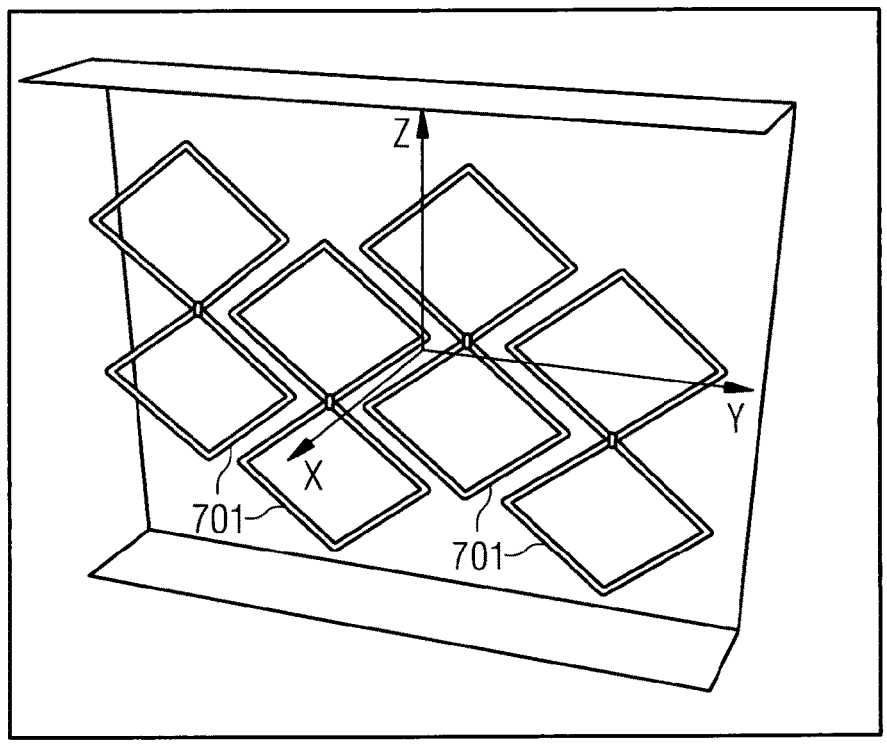
FIG. 8 shows a schematic diagram of an antenna array.

As an alternative, shown in FIG. 8, the base group or array may comprise four cubical bi-quad antennas 701. The four bi-quad antennas 701 may be arranged with an offset along the z-axis as shown in FIG. 8. The spacing between the bi-quads 701 along the y-axis (from center to center) is 0.25λ.

Although, in the examples above, an array comprises four antenna elements, any other suitable number of antenna elements may be included. In the example shown in FIG. 6, where the spacing between antenna elements 601 is 0.1λ, the space for the array may be sufficient to support four elements. If the spacing were reduced to 0.05λ it may possible to support eight antenna elements 601 in that space. In a row of antenna elements 601 spaced so as to be mutually coupled, the inner antenna elements may be affected by the neighbours in a similar manner, i.e. the inner antenna elements may produce similar antenna patterns instead of different ones. An array which includes two, three or four antenna elements 601 may provide suitable beam diversity.

The structure of sub-arrays, spaced at a distance, for example 0.5λ, such that there is negligible mutual coupling between sub-arrays may be repeated as often as is required. The size of the antenna, or how many arrays are provided in an antenna, may depend on one or more of the available space for placing the antennas, system level aspects such as beam forming gains or number of supported users or any other suitable criteria.

Figure 9:
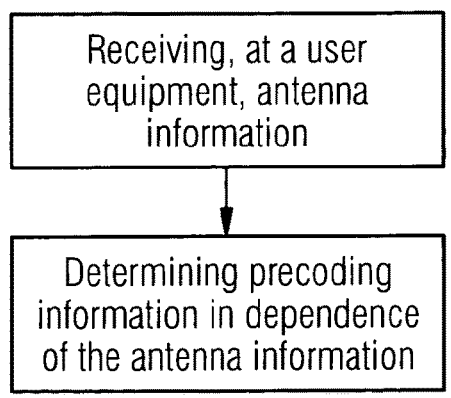
FIG. 9 shows a flow chart of a method for receiving antenna information.

For the overall array comprising the sub arrays, conventional precoding can be used to generate further beamforming gains. The precoder may be a unitary vector or matrix multiplication applied on the baseband signals to some or all antenna elements. On the physical layer it may generate beamformers. In LTE, the precoding weights may be defined in a codebook and the UE may report the preferred matrix index (PMI). The use of an antenna array as described herein may be signalled, for example to a UE, so that the UE can choose a PMI from a codebook which is adapted to the array structure. As shown in FIG. 9, a method is proposed comprising receiving, at a user equipment, antenna information and determining precoding information in dependence of the antenna information. The precoding information may be caused to be sent to a base station.

Passive antenna elements may be placed behind the antenna sub groups with respect to the boresight or transmit direction of the antennas. The impedance at the passive antenna elements is variable. Variation of the radiation patterns from the antenna array may be induced due to mutual coupling between the passive antenna elements and the antenna elements of the sub-arrays. For example, switching from inductive to capacitive load at the passive or "dump" antenna element might allow for continuous variation of beam patterns. That way, varying beam patterns might be generated without the need for extra RF chains, thereby avoiding one or more of the associated baseband processing, AD converters (ADC), power amplifiers (PA), etc. which may lead to a significant cost saving. Thus, in different time slots different antenna patterns might be generated for addressing different UEs. The passive antennas may be positioned sufficiently proximal to the antenna subgroups such that a change in the impedance of the passive antennas will affect the beam pattern of the antenna. Generally the passive antenna elements can be placed at any other location as long as they are sufficiently close to affect the beam patterns. The passive antenna elements may be placed at between 0.01 and 0.3λ.

Figure 10:
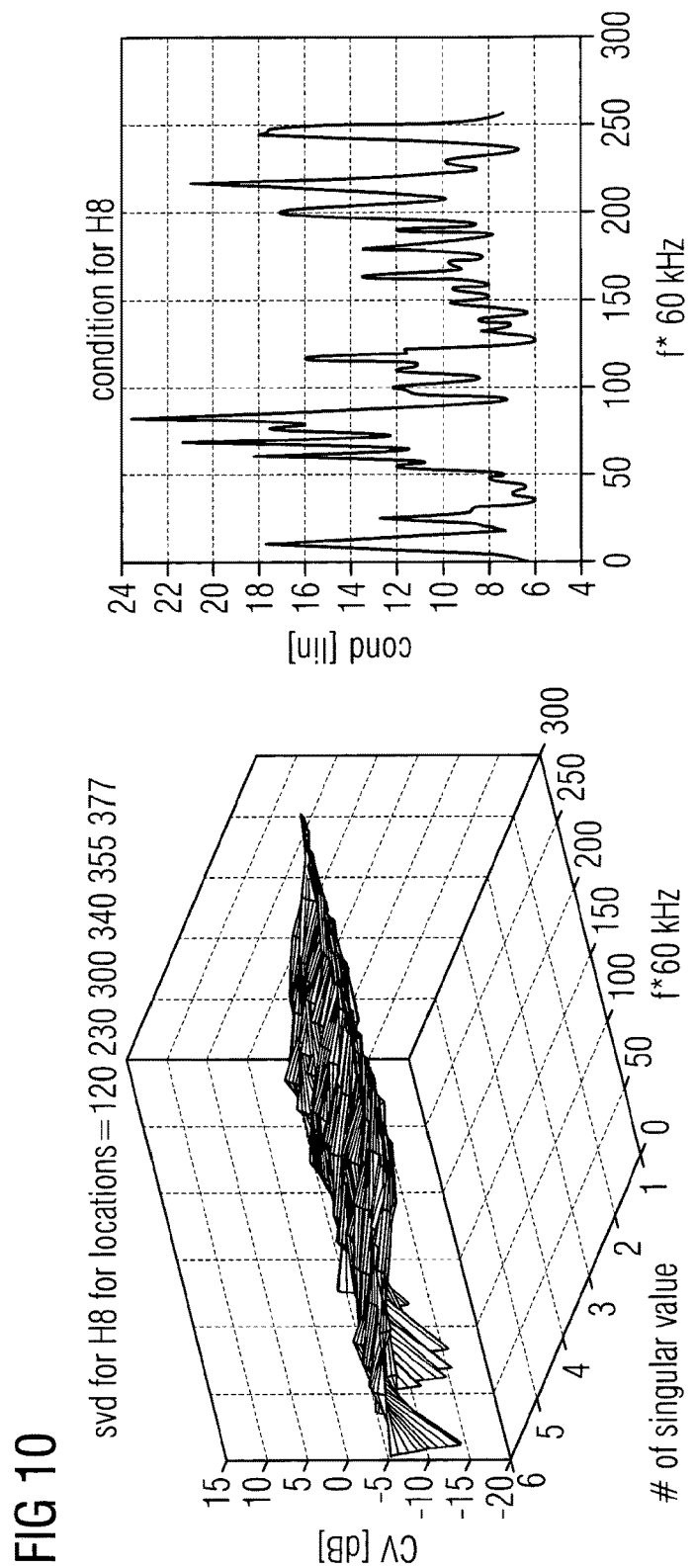
FIG. 10 shows performance results for the antenna array of FIG. 6.

FIG. 10 contains the resulting singular values and condition of the channel matrices indicating that—depending on frequency—five to six UEs could be served with singular values being larger than 0 dB, i.e. these UEs will still benefit from beamforming gains. Without mutual coupling only two UEs would be typically servable due to the strong channel correlations reducing the rank close to two.

Figure 11:
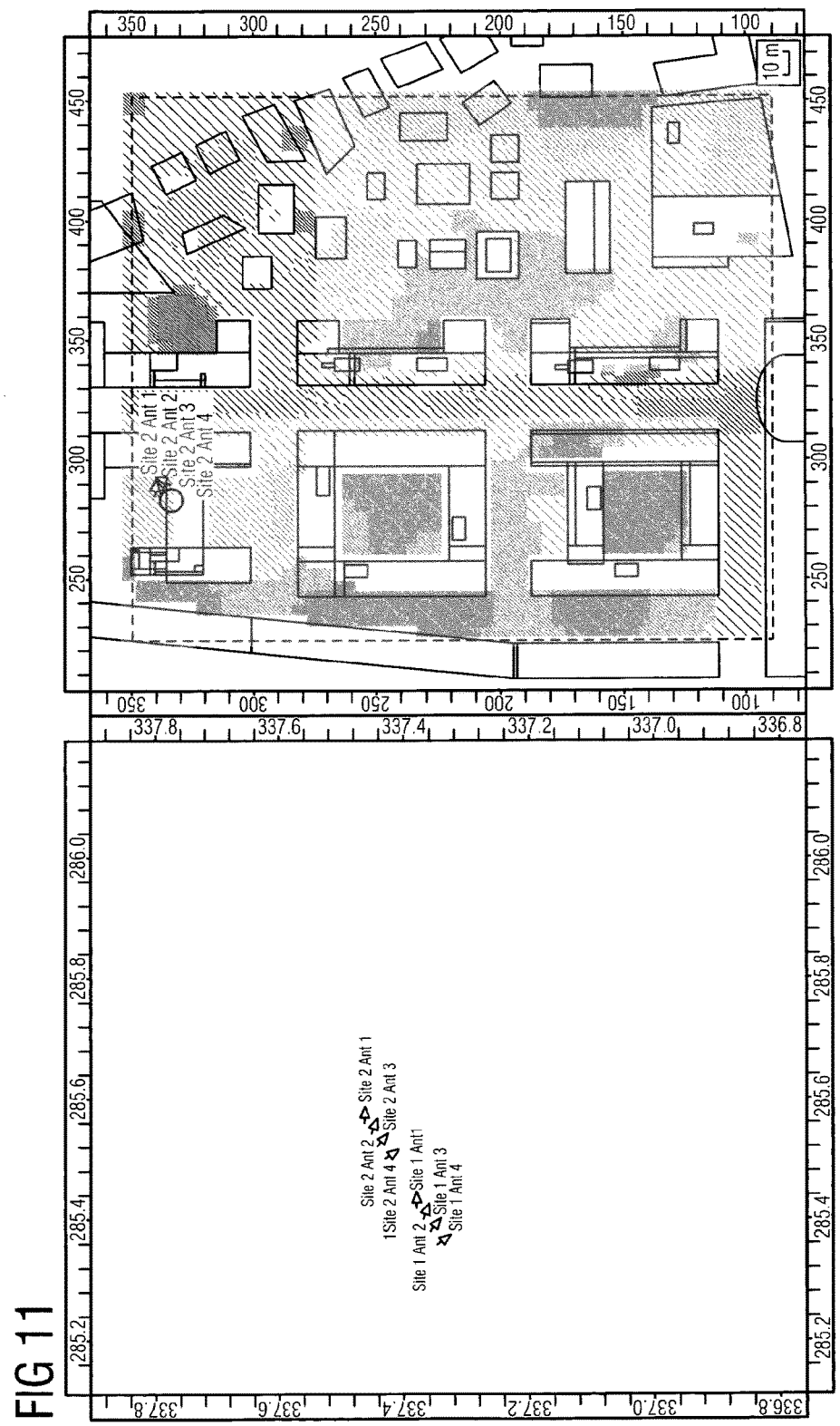
FIG. 11 shows ray tracing results of an extended link level simulation of an antenna array according to FIG. 6.

FIG. 11 shows the ray tracing results of an extended link level simulation. In this example. two groups of four 0.1λ spaced antennas have been placed in a distance of half a wavelength from each other. The mutual coupling is here assumed to change the azimuth angles by 20° between two closely spaced adjacent antennas. Six randomly placed UEs spread over the whole cell are being served from this 8 element antenna.

Note, the radio channel as such will be different an antenna configuration of some embodiments than for a conventional 0.5λ spaced ULA, but nonetheless from system level perspective the full rank will be available.

Antenna arrays as described above may be used in wireless communications systems such as those defined by LTE-A, as well as 5G. It is noted that whilst embodiments have been described in relation to LTE-A, similar principles can be applied to any other communication system where MIMO antennas are used. Antenna arrays as described above may be configured to operate below 3 or 5 GHz, for example, at frequencies such as 400 MHz, 700 MHz, 800 MHz, 900 MHz, 1.8 GHz, 2 GHz, 2.6 GHz, 3.5 GHz, 5 GHz etc. Antenna arrays as described above may be useful for antennas which operate at RF frequencies below 5 or even 10 GHz (due to the large size of the antenna arrays at these lower RF frequencies). Therefore, although certain embodiments were described above by way of example with reference to certain example architectures for wireless networks, technologies and standards, embodiments may be applied to any other suitable forms of communication systems than those illustrated and described herein.

Methods described herein may be implemented on a control apparatus as shown in FIG. 12. FIG. 12 shows an example of a control apparatus for a communication system, for example to be coupled to and/or for controlling a station of an access system, such as a base station or (e) node B, or a server or host, or to be coupled to or controlling a UE. In some embodiments, base stations comprise a separate control apparatus, unit or module. In other embodiments, the control apparatus can be another network element such as a radio network controller. The control apparatus can be an apparatus via which the operator can manage the network configurations, e.g. NetAct OSS. In some embodiments, each base station may have such a control apparatus as well as a control apparatus being provided in a radio network controller. The control apparatus 109 can be arranged to provide control on communications in the service area of the system. The control apparatus 109 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 109 can be configured to execute an appropriate software code to provide the control functions. It should be understood that the control apparatuses may include or be coupled to other units or modules such as radio parts or radio heads, used in or for transmission and/or reception. Although the apparatuses have been depicted as one entity in FIG. 12, different modules and memory may be implemented in one or more physical or logical entities.

It is noted that whilst embodiments have been described in relation to LTE and 3G, similar principles can be applied to any other communication system where Massive MIMO antennas are supported. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), FPGA, gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus comprising: a plurality of arrays,
wherein each array of the plurality of arrays comprises a plurality of antenna elements,
wherein adjacent antenna elements of each array are spaced at a first distance from one another,
wherein adjacent elements spaced at the first distance induces a current on an adjacent antenna element by a transmitting adjacent antenna element such that the adjacent antenna element does not propagate autonomously but is affected by the transmitting adjacent antenna element,
wherein adjacent arrays of the plurality of arrays are spaced from one another at a second distance, and
wherein the second distance is greater than the first distance.

2. The apparatus according to claim 1, wherein the first distance is such that the antenna elements of an array are mutually coupled.

3. The apparatus according to claim 1, wherein the second distance is such that there is negligible mutual coupling between the arrays.

4. The apparatus according to claim 1, wherein the antenna elements of each array are arranged linearly.

5. The apparatus according to claim 4, wherein the antenna elements of each array are arranged in a uniform linear array.

6. The apparatus according to claim 1, wherein the antenna elements of each array are configured to transmit at a wavelength, $\lambda$, and the first distance is between $0.01\lambda$, and $0.3\lambda$.

7. The apparatus according to claim 6, wherein the first distance is $0.25\lambda$.

8. The apparatus according to claim 6, wherein the first distance is $0.1\lambda$.

9. The apparatus according to claim 1, wherein the antenna elements of each array are configured to transmit at a wavelength, $\lambda$, and the second distance is greater than $0.25\lambda$.

10. The apparatus according to claim 9, wherein the second distance is greater than $0.5\lambda$.

11. The apparatus according to claim 1, wherein the antenna elements comprise dipole antenna elements.

12. The apparatus according to claim 11, wherein the antenna elements comprise a half wave dipole element.

13. The apparatus according to claim 1, wherein the antenna element comprises a bi-quad antenna element.

14. The apparatus according to claim 13, wherein the antenna elements are vertically offset from one another.

15. The apparatus according to claim 1 further comprising variable impedance passive antenna elements.

16. The apparatus according to claim 1, wherein each array comprises between two and eight antenna elements.

17. The apparatus according to claim 16, wherein each array comprises four antenna elements.

18. The apparatus according to claim 1, wherein the antenna elements are configured to operate at a first frequency less than or equal to 10 GHz, or wherein the antenna elements are configured to operate at a first frequency less than or equal to 5 GHz.

19. An apparatus comprising a linearly arranged plurality of arrays; each array comprising a plurality of antenna elements, adjacent antenna elements of each respective array mutually coupled; and wherein the plurality of arrays are substantially mutually uncoupled from one another.

20. A method comprising:
spacing adjacent antenna elements of a plurality of antenna elements such that a transmitting antenna element induces a current on an adjacent antenna element preventing the adjacent antenna element from propagating autonomously;
arranging the plurality of antenna elements in more than one antenna arrays; and
arranging the more than one antenna arrays such that adjacent antenna arrays of the more than one antenna arrays are at a second distance from one another where that second distance is greater than the first distance.

* * * * *